United States Patent
Marin-Martinod

(10) Patent No.: US 6,921,987 B2
(45) Date of Patent: Jul. 26, 2005

(54) POWER MANAGEMENT INSTALLATION IN AN AIRCRAFT

(75) Inventor: Thierry Marin-Martinod, Nesles-la-Vallee (FR)

(73) Assignee: Labinal, Montigny-le-Bretonneux (FR)

( * ) Notice: Subject to any disclaimer, the term of this patent is extended or adjusted under 35 U.S.C. 154(b) by 329 days.

(21) Appl. No.: 10/105,335

(22) Filed: Mar. 26, 2002

(65) Prior Publication Data

US 2002/0175567 A1 Nov. 28, 2002

(30) Foreign Application Priority Data

Mar. 30, 2001 (FR) .......................................... 01 04385

(51) Int. Cl.$^7$ ................................................ H02J 1/00
(52) U.S. Cl. ........................... 307/32; 307/31; 307/32; 307/38; 307/29
(58) Field of Search .......................... 307/32, 31, 38, 307/29

(56) References Cited

U.S. PATENT DOCUMENTS

| | | | |
|---|---|---|---|
| 5,266,838 A | | 11/1993 | Gerner |
| 5,546,591 A | * | 8/1996 | Wurzburg et al. .......... 713/322 |
| 5,754,445 A | * | 5/1998 | Jouper et al. ................ 700/295 |
| 6,046,513 A | | 4/2000 | Jouper et al. |
| 6,058,288 A | | 5/2000 | Reed et al. |
| 6,225,776 B1 | * | 5/2001 | Chai .......................... 320/109 |
| 6,301,528 B1 | * | 10/2001 | Bertram et al. ................ 701/1 |
| 6,633,802 B2 | * | 10/2003 | Sodoski et al. ............... 701/36 |

FOREIGN PATENT DOCUMENTS

| | | |
|---|---|---|
| DE | 39 36 638 | 3/1991 |
| WO | WO 98/19223 | 5/1992 |

* cited by examiner

*Primary Examiner*—Robert L. Deberadinis
(74) *Attorney, Agent, or Firm*—Stites & Harbison PLLC; Ross F. Hunt, Jr.

(57) ABSTRACT

A power management installation in an aircraft includes a power distribution network and at least two subscribers. Each subscriber has loads consuming electric power and local control means. The power management installation allocates, to each subscriber, a maximum total power for all the loads and evaluates, for each subscriber, the total electric power consumed. The conditions for controlling the loads of each subscriber are modified according to the controlled loads of the subscriber, the total electric power consumed by the subscriber and the maximum total power allocated to the subscriber.

11 Claims, 5 Drawing Sheets

POWER MANAGEMENT INSTALLATION IN AN AIRCRAFT

BACKGROUND OF THE INVENTION

The present invention concerns a power management installation in an aircraft, of the type having a power distribution network and at least two subscribers connected to the network, each subscriber having a set of loads consuming electric power and local means of controlling the loads.

DESCRIPTION OF THE PRIOR ART

In passenger transport aircraft, it is necessary to make available to each passenger a certain number of items of electrically powered equipment, this equipment providing maximum comfort for the passenger.

In particular, each passenger normally has individual lighting designated as a reading light, a supply socket for a portable computer, video equipment for viewing films, comfort equipment such as massage devices and a set of electrical actuators for moving movable components of the passenger seat.

The proliferation of electrically powered devices made available to each passenger considerably increases the electric power consumed within the aircraft.

Thus it is necessary to manage the power consumed by the passengers during the flight.

To this end, it is known, notably from U.S. Pat. No. 5,754,445 and U.S. Pat. No. 6,046,513, that the power consumed by each passenger can be monitored, the total power currently consumed by all the passengers can be compared with a predetermined threshold value, and the use of additional power by any passenger in the aircraft can be prevented if the total power currently consumed is greater than the predetermined threshold value corresponding to the maximum total power which can be allocated to the passengers.

The installation described in the aforementioned document thus makes it possible to effectively limit the total power consumed by all the passengers.

However, since, after the maximum total power which can be allocated to all the passengers is reached, no passenger can obtain any further power. Thus only the passengers which operate their electrical equipment first can have power available. On the other hand, the passengers wishing to switch on additional electrical equipment whilst a very large number of passengers are already consuming a large amount of electric power, can no longer obtain any power.

Thus frustration may arise in some passengers who are not able to switch on some equipment available to them whilst similar equipment is functioning for the neighbouring passenger. Such a management system may give rise to conflict between passengers.

The aim of the invention is to propose a power management installation for avoiding excessive power consumption by passengers, whilst preventing some passengers being able to use any one of the items of electrical equipment made available to them.

SUMMARY OF THE INVENTION

To this end, the object of the invention is a power management installation of the aforementioned typed, characterised in that it has:

means for allocating, to each subscriber, a maximum total power for the loads of the subscriber;

means of evaluating, for each subscriber, the total electric power consumed;

means of modifying the conditions for controlling the loads of each subscriber, according to the loads controlled by the subscriber, the total electric power consumed by the subscriber and the maximum total power allocated to the subscriber.

According to particular embodiments, the power management installation has one or more of the following characteristics:

it has means of assigning, to each subscriber, at least operating use parameter for the subscriber and the said means for allocating a total maximum power to each subscriber are adapted to allocate the said maximum total power according to the operating parameter or each of the parameters of the subscriber;

an operating parameter is a value representing the total power available for the subscriber;

the means of evaluating, for each subscriber, the total electric power consumed include means of measuring, for each load, the power actually consumed;

the means of evaluating, for each subscriber, the total electric power consumed comprise means of storing, for each load, a nominal consumed power value, and means of estimating the total electric power consumed from the nominal consumed power values for the loads actually in operation;

the means of modifying the control conditions for the loads comprise means of comparing the evaluation of the total electric power consumed and the total maximum power allocated and means for the priority control of some loads according to the result of the comparison of the evaluation of the total power consumed and the maximum total electric power allocated;

the priority control means include means of comparing the maximum total power allocated with at least one threshold value, and the said priority control means are adapted to select an operating mode defining priority rules, according to the result of the comparison or each of the comparisons, and for applying the priority rules defined by the said operating mode selected;

the means of modifying the control conditions of the loads are adapted to inhibit the functioning of some loads;

the means of modifying the control conditions for the loads are adapted to reduce the power consumed by some loads;

the means for allocating a total maximum power to each subscriber include a local power management unit associated with each subscriber and a central power management unit connected to the said local power management unit by an information transfer network;

each local power management unit has a single current converter common to each of the loads.

BRIEF DESCRIPTION OF THE DRAWINGS

The invention will be understood more clearly from a reading of the following description, given solely by way of example and made with reference to the drawings, in which.

DESCRIPTION OF THE PREFERRED EMBODIMENTS

Figure 1:
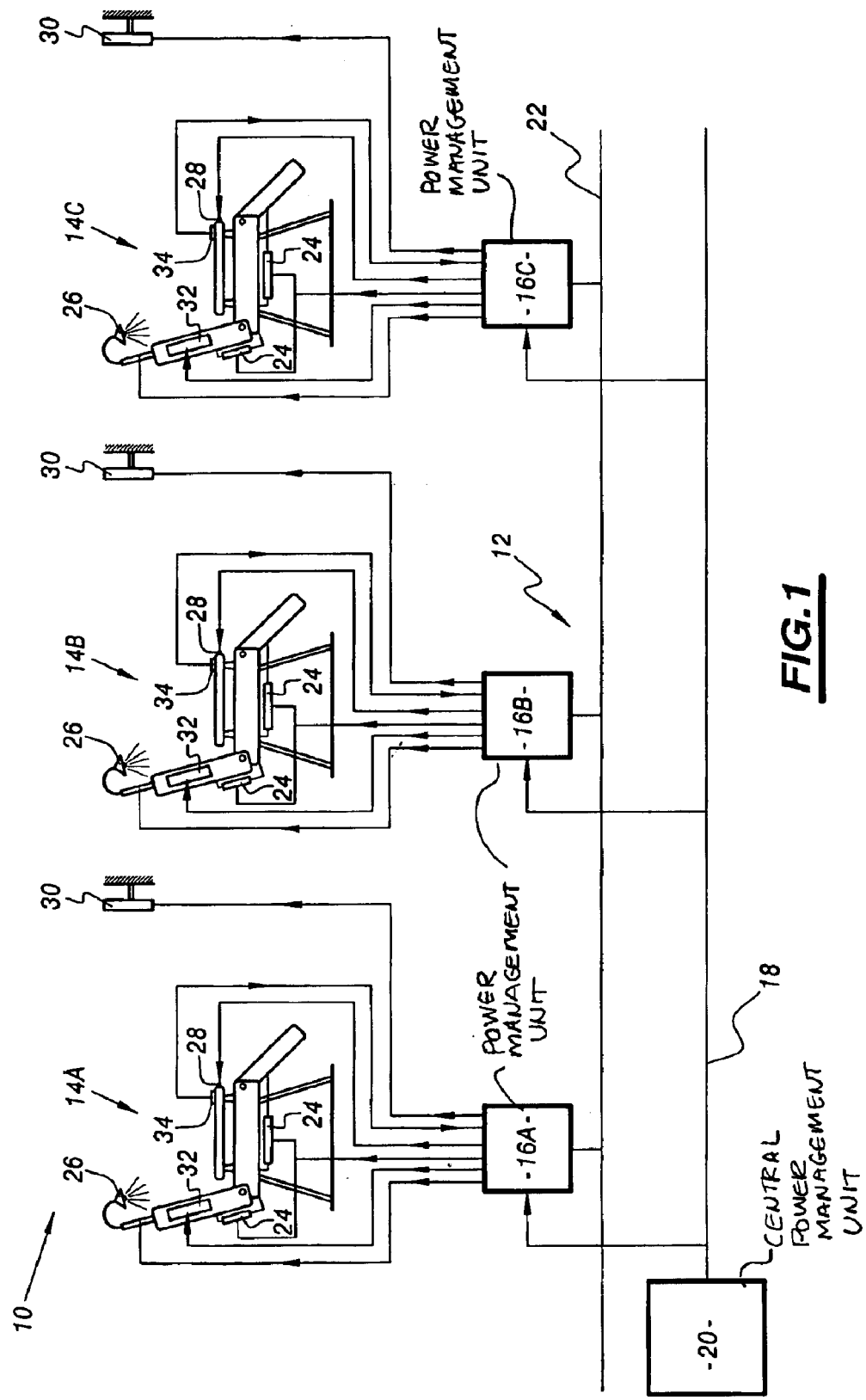
FIG. 1 is a schematic view of a power management installation according to the invention.

FIG. 1 depicts an electric power distribution installation 10 incorporating a power management installation 12. This power distribution installation is intended to be installed in a vehicle, notably a passenger transport aircraft.

The installation includes a set of subscribers 14A, 14B, 14C. Each subscriber corresponds to all the electrical devices or loads made available to a passenger.

For example, an installation according to the invention provides the management of power with seventy first-class subscribers when the aircraft is able to transport three hundred passengers.

In the installation according to the invention, each subscriber has a local power management unit. Only three local units denoted 16A, 16B, 16C are depicted for reasons of clarity. These units are all identical. Each local power management unit is connected by an information transfer network 18 to a central power management unit 20.

In addition, each local power management unit 16A, 16B, 16C is connected to a collective electric power distribution network 22.

Each subscriber includes a set of loads consuming electric power. Each load is connected to a local power management unit 16A, 16B, 16C of the subscriber.

More precisely, in the example in question, a motorised seat is made available to each passenger. Thus each subscriber has several electrical actuators 24 allowing the automatic movement of the movable parts of the seat in order, for example, to move the latter from a seated position to a lying-down position.

In addition, each subscriber has a reading lamp 26, a supply socket 28 for a portable computer, video reproduction equipment 30 and a set of comfort devices 32 such as massage devices.

Each consuming load made available to the passenger can be controlled individually by the passenger from a keypad 34. Each keypad is connected to an associated local power management unit 16A, 16B, 16C.

Figure 2:
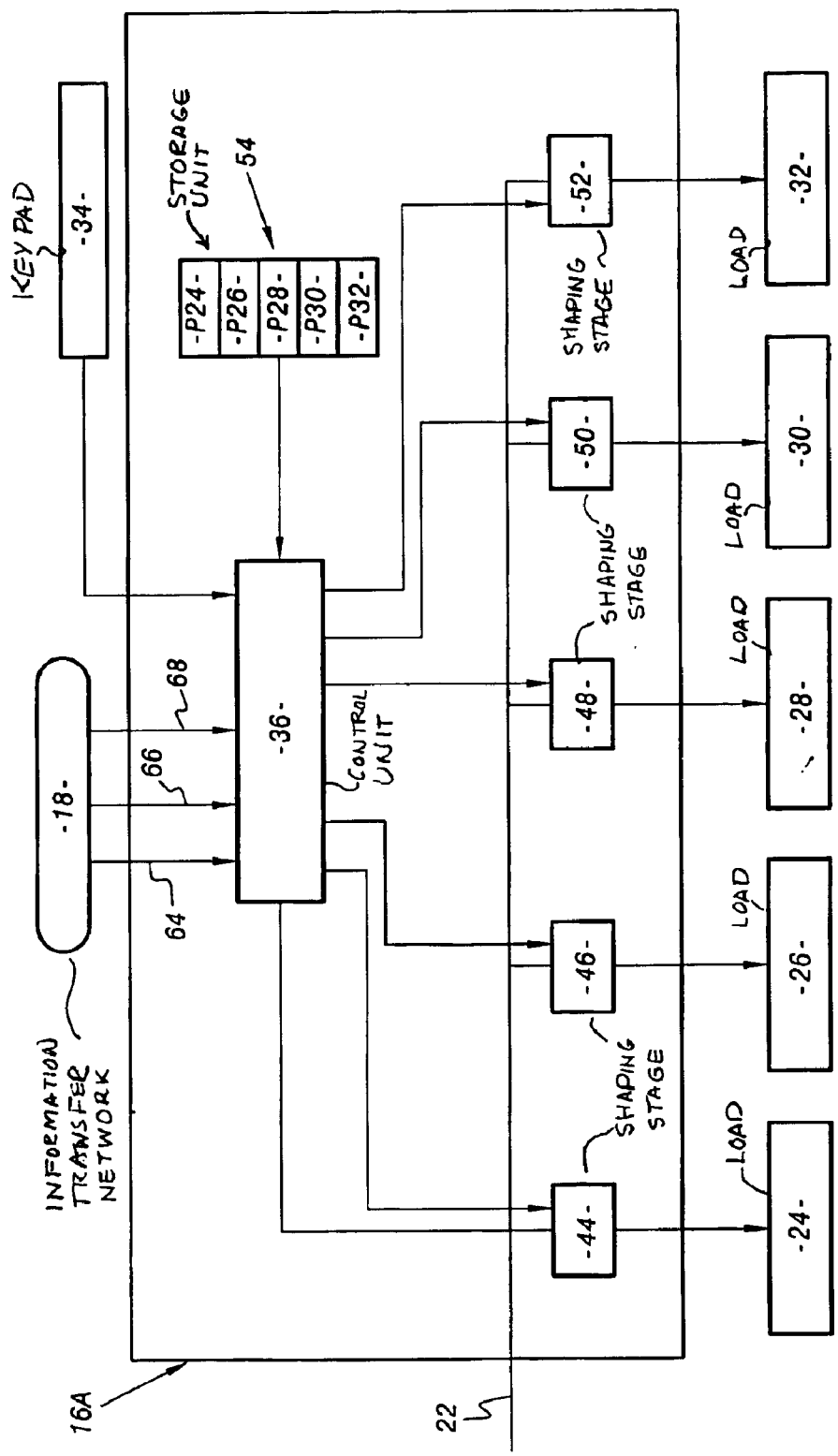
FIG. 2 is a schematic view of a first embodiment of a local power management unit peculiar to a subscriber.

FIG. 2 depicts in more detail the structure of a local power management unit 16A. This unit is shown with its connection to the power distribution network 22, to the information transfer network 18, to the keypad 34 and to the loads 24 to 32.

Each local power management unit has a control unit 36, consisting of an information processing unit able to implement a predetermined algorithm. The control unit 36 is formed for example by a microcontroller associated with an adapted environment.

The control unit 36 is connected to the network 18 by a communication interface.

Each of the loads 24 to 32 is connected to the power distribution network 22 through a stage for shaping the supply current, these stages being denoted 44, 46, 48, 50, 52 respectively for the loads 24, 26, 28, 30 and 32.

Each current shaping stage 44 to 42 is connected, in order to control it, to the control unit 36.

Under the control of the control unit 36, each current shaping stage provides a supply or a stoppage of supply to the load connected to the output, or a particular shaping of the current, in order to reduce the power consumed by this load.

In particular, in the case of the actuators 24, the supply current shaping stage 44 is adapted to produce a current modifying the speed of the actuators in order to vary the power consumed.

This speed variation is for example achieved by means of a regulation of the PWM (pulse width modulation) type.

In particular, in the case of the actuators 24, the supply current shaping stage 44 is adapted to produce a current varying the speed of the actuators in order to vary the power consumed. This speed variation is for example achieved by means of a regulation of the PWM (pulse width modulation) type.

In practice, the supply current shaping stages include a single current converter, this converter being common to each of the shaping stages. This converter incorporates for example a transformer. At the output from the common converter, each shaping stage has current switching and regulation means which are peculiar to it.

In the embodiment illustrated in FIG. 2, the local power management unit has storage means 54 connected to the control unit 36. These storage means 54 contain, for each load connected to the local power management unit, a characteristic value denoted P24 to P32 for the loads 24 to 32. This characteristic value is equal to the nominal power consumed by the associated load, when it is functioning.

Moreover, the control unit 36 is adapted to receive, from the information transmission network 18, a set of operating parameters for modifying the control of the loads enclosed by the user from the keypad 34.

Although the information transmission network 18 can be of any adapted type, for reasons of clarity in FIG. 2 each operating parameter is assumed to be communicated to the control unit 36 at a specific input.

In particular, at a first input 64, the control unit 36 receives a value Pd representing a total power available for the subscriber in question.

At the input 66, the control unit 36 is adapted to receive altitude information A. This binary information indicates whether the altitude is greater than 10,000 ft or less than 10,000 ft.

The input 68 is adapted to receive information T representing the presence of turbulence in the area through which the aircraft is passing.

According to the invention, the central power management unit 20 is adapted to produce and to send to each local power management unit 16A, 16B, 16C the operating parameters, namely the total power Pd available for the corresponding subscriber and information A, T representing the altitude of the aircraft and the presence of turbulence in the region being passed through.

According to the invention, the power management installation 12 is adapted to enable each subscriber to use only a maximum total power $P_{max}$ allocated to the subscriber according to the operating parameters. For this purpose, the local power management unit 36 of each subscriber is adapted, according to the requests made by the user from the keypad 34, to control in an adapted manner each of the loads made available to the user so that the total power consumed by the subscriber is always less than the maximum total power $P_{max}$ allocated to the subscriber. The maximum total power $P_{max}$ is determined by each local power management unit from the total power Pd available for the subscriber and the flight conditions represented by the information A and T.

Figure 3:
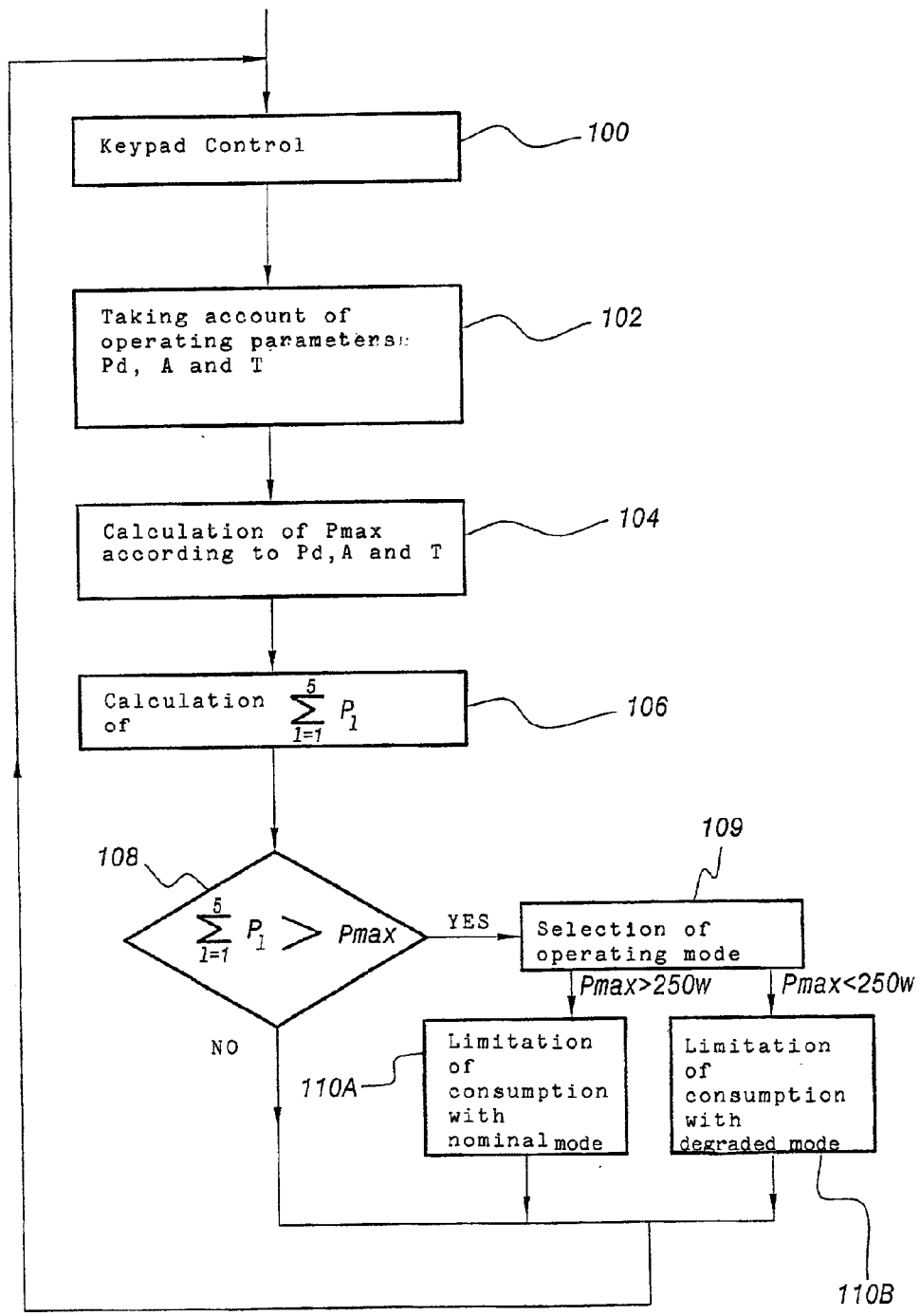
FIG. 3 is a flow diagram of the algorithm implemented in each local power management unit illustrated in FIG. 2.

For this purpose, the control unit 36 for each subscriber implements the algorithm illustrated in FIG. 3.

At step 100, the control unit 36 polls the keypad 34 with a view to determining the requests by the user.

At step 102, the operating parameters Pd, A and T sent by the central power of management unit 20 are taken into account.

From these operating parameters, the calculation of the total maximum allocated power $P_{max}$ is effected at step 104.

This total maximum power allocated to this subscriber takes account of all the operating parameters received at the inputs 64 to 68. In particular, the total available power Pd is taken into account as well as the altitude A of the aircraft and the presence of turbulence T in the area being passed through.

At step 106, the control unit 36 calculates an estimation of the total consumed power at the given instant. For this purpose, the control unit determines the sum of the nominal powers Pi stored in the means 54 for the loads 24 to 32 actually operating.

At step 108, the estimation of the total consumed power is compared with the maximum total power allocated $P_{max}$.

If this estimation of the total consumed power is less than the maximum total allocated power $P_{max}$, the algorithm is once again implemented.

On the other hand, if the estimation of the total consumed power is greater than the maximum total allocated power $P_{max}$, a consumption limitation phase is implemented locally by the control unit 36 of the local management unit concerned.

In particular, a step 109 of selecting an operating mode is first of all implemented. This selection step defines the operating mode of the subscriber according to the maximum total allocated power $P_{max}$. Each operating mode defines a set of priority rules for determining the loads which can be supplied, and the loads which are to be stopped or for which the consumed power must be reduced according to the total maximum power allocated $P_{max}$.

In the embodiment envisaged, two operating modes are provided, a first operating mode corresponding to a nominal mode in which the maximum total allocated power $P_{max}$ is greater than 250 W and a degraded operating mode which the maximum total allocated power $P_{max}$ is less than 250 W.

At the end of the selection step 109, and according to the operating mode selected, a consumption limitation step 110A or 110B is implemented. This step defines the loads whose supply must be stopped, as well as the loads whose consumed power must be reduced, according to the priority rules peculiar to the operating mode selected at step 109.

In the following table there is given, for each of the loads, the nominal power stored in the memory 54. In this same table different situations are illustrated corresponding to different maximum total allocated powers $P_{max}$ and different flight situations.

|  |  | Reading light | PC | Video | Comfort | Actuators | Total |
|---|---|---|---|---|---|---|---|
| Nominal Power $P_{max}$ mode |  | 10 | 75 | 100 | 50 | 100 | 335 |
| 1) 300 W Nominal | a) | 10 | inhibited | 100 | 50 | 100 | 260 |
|  | b) | 10 | 75 | 100 | 50 | stopped | 235 |
|  | c) | 10 | 75 | 100 | inhibited | 100 | 285 |
| 2) 200 W Degraded | a) | off | 75 | 100 | inhibited | stopped | 175 |
|  | b) | off | inhibited | 100 | inhibited | 100 | 200 |
|  | c) | 10 | inhibited | 100 | inhibited | 90 | 200 |
| 3) Turbulence or <10,000 feet |  | 10 | inhibited | inhibited | inhibited | 100 | 110 |

The terms "off" and "stopped" signify that the functioning of the load in question is not required by the passenger. The term "inhibited" means that the local power management unit inhibits the power supply to the load in question whatever the command from the passenger for this load.

In the example indicated above, the sum of the nominal powers of the loads is 335 watts.

In the management algorithm used, the priority equipment are the reading light 26 and the actuators 24. Thus their functioning is favored compared with other items of equipment, in the event of a maximum total allocated power $P_{max}$ which is insufficient to satisfy all requirements.

Priority is established between the PC (supply socket for a computer 28), Video and Comfort, for example: first of all the Video then the PC and finally Comfort (after the reading light and actuator priorities).

For example 1), the maximum total allocated power $P_{max}$ (300 watts: nominal mode) is less than the sum of the nominal powers of the loads. In this case, only two items of equipment out of three amongst the PC, Video and Comfort are enabled.

For case a) of example 1, if the Video and Comfort are on and the actuators are moving, the user will not be able to power the PC.

For case b) for example 1), if the actuators are not moving, the PC, Video and Comfort can function.

If the user starts up the actuators, (case b to case c), the Comfort will be stopped, this being defined as the lowest priority equipment in nominal mode.

For example (2), the maximum total allocated power $P_{max}$ is equal to 200 watts. Degraded mode is then selected at step 109. In this mode, only two items of equipment out of three (PC, Video, Comfort) can be powered when the actuators are not in movement (case a), and only one item of equipment can be powered when the actuators are in movement (case b).

In degraded mode, the power of the actuators can be limited intentionally according to the equipment switched on.

When the actuators are in movement and the reading light is on (case c), the power to the actuators is reduced. This is achieved for example by slowing down the actuators when they are functioning simultaneously in order not to exceed 90 watts, or by making the actuators function one after the other.

For example 3), the three items of equipment PC, Video and Comfort are inhibited in the event of turbulence or altitude below 10,000 feet.

Figure 4:
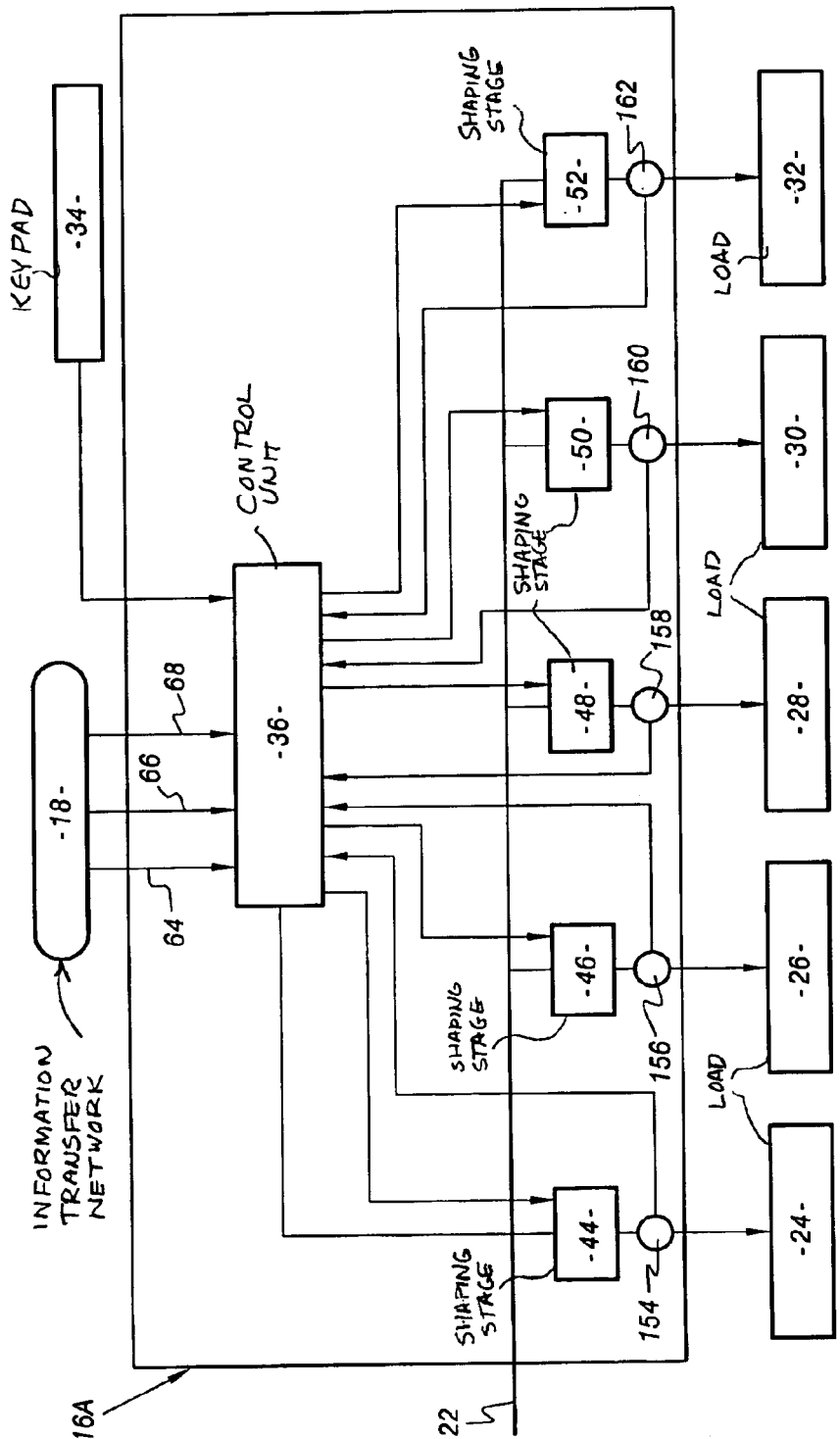
FIG. 4 is a schematic view of a second embodiment of a local power management unit peculiar to a subscriber.

FIG. 4 depicts a variant embodiment of a local power management unit 16A according to invention. This unit repeats the general structure of the unit described with regard to FIG. 2. Thus the identical or similar elements are designated by the same reference numbers.

However, in this variant embodiment, the memory 54 is omitted.

On the other hand, each local power management unit has a current sensor 154, 156, 158, 160, 162 which is disposed between the current shaping unit and the associated load. These current sensors are each connected to a control unit 36 and are adapted to send thereto information representing the current supplying the load. This information represents the instantaneous power consumed by the associated load.

Figure 5:
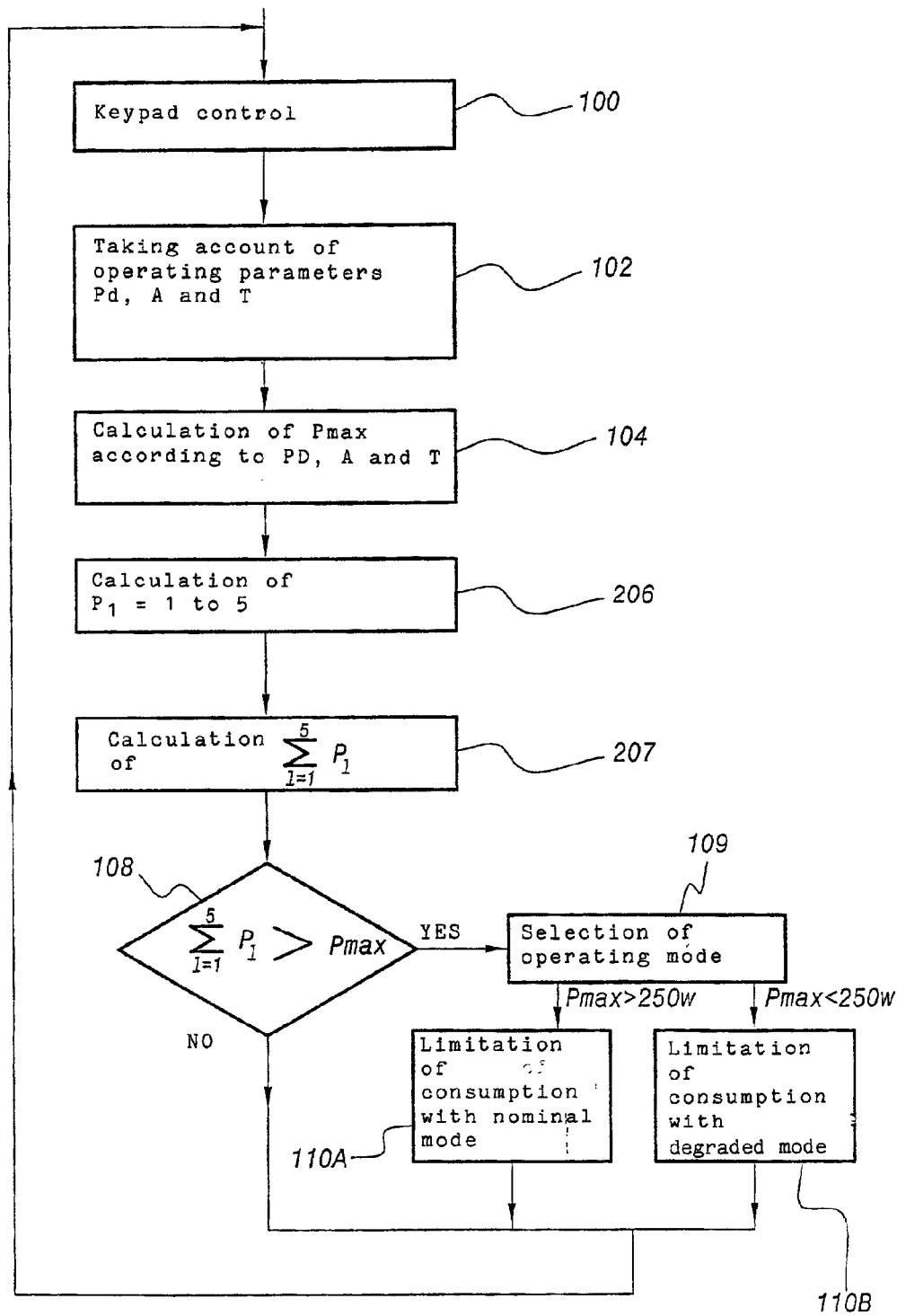
FIG. 5 is a flow diagram of the algorithm implemented in each local power management unit illustrated in FIG. 4.

In addition, the control unit 36 implements the algorithm illustrated in FIG. 5 which is slightly different from the algorithm illustrated in FIG. 3.

In particular, this algorithm is adapted to determine, from currents actually supplied to its load, the power actually consumed as each instant by the load in question.

Thus, as illustrated in FIG. 5, the algorithm implemented repeats the first three steps 100 to 104.

However, step 106 is replaced by a step 206 of calculating, for each load, the instantaneous power Pi actually consumed, this power being determined from the current measured by the associated sensor 154 to 162.

This step is followed by a step 207 of summing the powers thus calculated in order to determine the total power consumed at the given instant by all the loads connected to the local management unit.

The remainder of the algorithm implemented is identical to the algorithm described with regard to FIG. 3.

It will be understood that such a power management unit guarantees each passenger use of each of the items of equipment available to him provided that he does not use them all at the same time.

In addition, the total available power allocated to all the passengers is limited, whilst avoiding some passengers being deprived of the use of all their equipment if many other passengers are already in the process of using their equipment.

Moreover, recourse, in each local power management unit, to the same converter for providing the supply to all the loads considerably reduces the size of the local power management unit.

This is because up till then a supply peculiar to each load was installed for each subscriber. Thus the total power able to be processed by all the converters associated with each of the loads was very much greater than the total power able to be actually consumed at a given instant by all the loads.

I claim:

1. A power management installation in an aircraft including a power distribution network and at least two subscribers connected to the power distribution network, each subscriber having a set of loads, consuming electric power and local means controlling the loads, wherein the power management installation comprises:

(a) means for allocating, to each subscriber, a total maximum power for all the loads of the subscriber;
    (b) means for evaluating, for each subscriber, the total electric power consumed; and
    (c) means for modifying the conditions for controlling the loads of each subscriber, according to the controlled loads of the subscriber, the total electric power consumed by the subscribe, the total maximum power allocated to the subscriber and priority rules particular to each individual subscriber for determining, among the set of loads of the subscriber, the power which can be allocated to each load of the set of loads.

2. A power management installation according to claim 1, comprising means of assigning, to each subscriber, at least one operating parameter for the subscriber and said means for allocating, to each subscriber, a total maximum power adapted to allocate said total maximum power according to said at least one operating parameter or parameters of the subscriber.

3. A power management installation according to claim 2, wherein an operating parameter is a value representing a total available power for the subscriber.

4. A power management installation according to claim 1, wherein said means of evaluating, for each subscriber, the total electric power consumed comprise means of measuring, for each load, the power actually consumed.

5. A power management installation according to claim 1, wherein said means of evaluating, for each subscriber, the total electric power consumed comprise means of storing, for each load a nominal consumed power value and means of estimating the total electric power consumed from the nominal consumed power values for the loads actually in operation.

6. A power management installation according to claim 1, wherein said means of modifying the load control conditions include means of comparing the evaluation of the total electric power consumed and the maximum total power allocated and means for the priority control of some loads according to the result of the comparison of the evaluated consumed power and the maximum total electric power allocated.

7. A power management installation according to claim 6, wherein the priority control means include means of comparing said maximum total power allocated with at least one threshold value, and wherein said priority control means are adapted to select an operating mode defining priority rules, according to the result of said at least one comparison, and to apply the priority rules defined by the said operating mode selected.

8. A management installation according to claim 1, wherein said means of modifying the load control conditions are adapted to inhibit the functioning of some loads.

9. A management installation according to claim 1, wherein said means of modifying the load control conditions are adapted to reduce the power consumed by some loads.

10. A management installation according to claim 1, wherein said means for allocating a maximum total power to each subscriber include a local power management unit associated with each subscriber and a central power management unit connected to said local power management units by an information transfer network.

11. A management installation according to claim 10, wherein each local power management unit has a single current converter common to each of the loads.

* * * * *